(12) United States Patent
Chen

(10) Patent No.: US 8,345,011 B2
(45) Date of Patent: Jan. 1, 2013

(54) METHOD FOR EXPRESS EXECUTION OF PLAYING COMPUTER MULTIMEDIA DATA WITH DEVICE GROUP ACTIVATION

(75) Inventor: Chiu-Fu Chen, Sanchong (TW)

(73) Assignee: Getac Technology Corporation, Hsinchu (TW)

( * ) Notice: Subject to any disclaimer, the term of this patent is extended or adjusted under 35 U.S.C. 154(b) by 1112 days.

(21) Appl. No.: 11/224,000

(22) Filed: Sep. 13, 2005

(65) Prior Publication Data

US 2007/0057910 A1 Mar. 15, 2007

(30) Foreign Application Priority Data

Jul. 22, 2005 (TW) ................................. 94125006 A

(51) Int. Cl.
G09G 5/00 (2006.01)
(52) U.S. Cl. ...................................................... 345/172
(58) Field of Classification Search .......... 345/168–172; 710/1; 713/1, 2; 361/688; 702/57; 700/94; 720/652
See application file for complete search history.

(56) References Cited

U.S. PATENT DOCUMENTS

| | | | | |
|---|---|---|---|---|
| 5,220,583 A * | 6/1993 | Solomon | | 375/328 |
| 5,560,024 A | 9/1996 | Harper et al. | | |
| 5,793,980 A | 8/1998 | Glaser et al. | | |
| 5,881,318 A | 3/1999 | Liebenow | | |
| 5,978,923 A * | 11/1999 | Kou | | 713/323 |
| 6,006,285 A * | 12/1999 | Jacobs et al. | | 710/14 |
| 6,038,614 A * | 3/2000 | Chan et al. | | 710/1 |
| 6,414,675 B1 | 7/2002 | Shen | | |
| 6,654,827 B2 | 11/2003 | Zhang et al. | | |
| 6,763,458 B1 | 7/2004 | Watanabe et al. | | |
| 7,076,644 B2 | 7/2006 | Hsu | | |
| 7,076,646 B2 | 7/2006 | Chang | | |
| 2001/0056509 A1 * | 12/2001 | Iwata | | 710/20 |
| 2002/0068988 A1 * | 6/2002 | Chan et al. | | 700/94 |
| 2002/0152372 A1 * | 10/2002 | Cole et al. | | 713/2 |
| 2002/0162444 A1 * | 11/2002 | Yu et al. | | 84/601 |

(Continued)

FOREIGN PATENT DOCUMENTS

CN 1484143 3/2004

(Continued)

OTHER PUBLICATIONS

Communication from the German Patent Office regarding a corresponding German Patent Application 10 2005 056 473 dated Oct. 29, 2007.

*Primary Examiner* — Chanh Nguyen
*Assistant Examiner* — Sanghyuk Park

(57) ABSTRACT

A method for express execution of multimedia playing with device group activation is provided. A device activation group table is provided to a multimedia computer system. The device activation group table defines, according to the functional features of each multimedia players connected to the computer, each hot key and its associated multimedia player, driver, and application program. To execute the express activation of the group function menu, the method includes the following steps: detecting the depression of a hot key; computer loading and executing the driver for the multimedia player associated with the depressed hot key in the computer by referring to the device activation group table; and loading and executing the application program for the multimedia player associated with the depressed hot key to activate the associated multimedia player. For those multimedia players associated with the hot keys that are not depressed, no action is taken.

11 Claims, 7 Drawing Sheets

U.S. PATENT DOCUMENTS

| | | | |
|---|---|---|---|
| 2003/0083761 A1* | 5/2003 | Jacobs et al. | 700/94 |
| 2003/0182546 A1 | 9/2003 | Suzuki et al. | |
| 2004/0039904 A1* | 2/2004 | Lin et al. | 713/1 |
| 2004/0090738 A1* | 5/2004 | Wu | 361/680 |
| 2004/0093489 A1* | 5/2004 | Hsu | 713/2 |
| 2004/0205396 A1* | 10/2004 | Wu et al. | 714/23 |
| 2004/0215844 A1* | 10/2004 | Numano et al. | 710/14 |
| 2004/0226020 A1* | 11/2004 | Birmingham | 719/310 |
| 2005/0097309 A1* | 5/2005 | Chang | 713/1 |
| 2005/0204181 A1* | 9/2005 | Montero et al. | 714/4 |
| 2006/0026612 A1* | 2/2006 | Lee et al. | 720/652 |
| 2006/0085145 A1* | 4/2006 | Matsuoka et al. | 702/57 |

FOREIGN PATENT DOCUMENTS

| | | |
|---|---|---|
| CN | 1503104 | 6/2004 |
| JP | 2000-20285 A | 1/2000 |
| JP | 2005-134985 A | 5/2005 |

* cited by examiner

| Hot Key Field | Hot Key Code Field | Mapped Driver Field | Mapped Application Program Field | Mapped Device field |
|---|---|---|---|---|
| Hot Key#1 | 00 | (1)CD Player Driver<br>(2)Audio Device Driver | CD Player Application Program | (1)CD Reading Device<br>(2)Audio Device |
| Hot Key#2 | 01 | (1)Digital Music Device Driver<br>(2)Audio Device Driver | Digital Music Device Application Program | (1)Digital Music Reading Device<br>(2)Audio Device |
| Hot Key#3 | 10 | (1)VCD Player Driver<br>(2)Audio Device Driver<br>(3)Display Driver | VCD Player Application Program | (1)VCD Reading Device<br>(2)Audio Device<br>(3)Display |
| Hot Key#4 | 11 | (1)TV Driver<br>(2)Audio Device Driver<br>(3)Display Driver | TV Application Program | (1)TV Signal Receiver<br>(2)Audio Device<br>(3)Display<br>(4)TV Tuner |

*FIG.4*

METHOD FOR EXPRESS EXECUTION OF PLAYING COMPUTER MULTIMEDIA DATA WITH DEVICE GROUP ACTIVATION

FIELD OF THE INVENTION

The present invention relates to a method for playing computer multimedia and, more particularly, to a method for express execution of playing computer multimedia with device group activation.

BACKGROUND OF THE INVENTION

The multimedia playing system made with the integration of a computer system and an audiovisual player is gaining popularity and is widely used on many occasions, including offices and households, because the rapid development of computer technology.

The design of the conventional multimedia playing systems is basically interfacing a computer system with an audiovisual player. With this type of design, the user usually needs to boot the computer system up in order to activate and operate the audiovisual player. In other words, the user must wait until the computer system completes the BIOS program initialization, POST program, peripheral detection and driving, OS activation, system state setting, and so on, before the user can execute the audiovisual program to play the audiovisual data. It is inconvenient for the user as there is no shortcut to bypass the tedious booting process of the computer system.

The aforementioned drawback deters the computer-based multimedia system from behaving like a household appliance with a quick activation, such as a television set. As the computer provides many functions, yet most computer users usually use one or few computer functions at a time, such as music listening, TV watching, movie watching, it is a waste of time for the user to wait for the computer system to execute the initialization of all the hardware before they can use the intended function.

SUMMARY OF THE INVENTION

The present invention is provided to overcome the aforementioned drawbacks of the conventional methods of express execution of playing computer multimedia. A primary objective of the present invention is to provide a method for playing computer multimedia so that the computer can initialize only the hardware related to the application program selected by the user in order to shorten the waiting period.

Another objective of the present invention is to provide a method for playing computer multimedia with a device group activation table to manage the activation and operation of multimedia players with a device activation group table.

To achieve the aforementioned objectives, the present invention provides a device activation group table. The device activation group table defines, according to the functional features of each multimedia player connected to the computer, each hot key and its associated multimedia player, driver, and application program. To execute the express activation with the device group activation table, the method performs the following steps: detecting depression or actuation of a hot key; computer loading and executing a driver for a multimedia player associated with the depressed hot key by referring to the device activation group table; and loading and executing application program for the multimedia player associated with the depressed hot key to activate the associated multimedia player. For those multimedia players associated with hot keys not being depressed, no action is taken.

In comparison with the conventional methods, the present invention allows a multimedia computer system with a plurality of multimedia players, such as CD, VCD, DVD players, TV, and so on, to selectively activate the associated driver and application program according to user's selection. This saves the user from waiting the computer system to activate all the hardware before the intended application program can start execution.

These and other objectives, features, and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein:

FIG. 4 shows a schematic view of a device activation group table of the present invention;

DETAILED DESCRIPTION OF THE PREFERRED EMBODIMENTS

Figure 1:
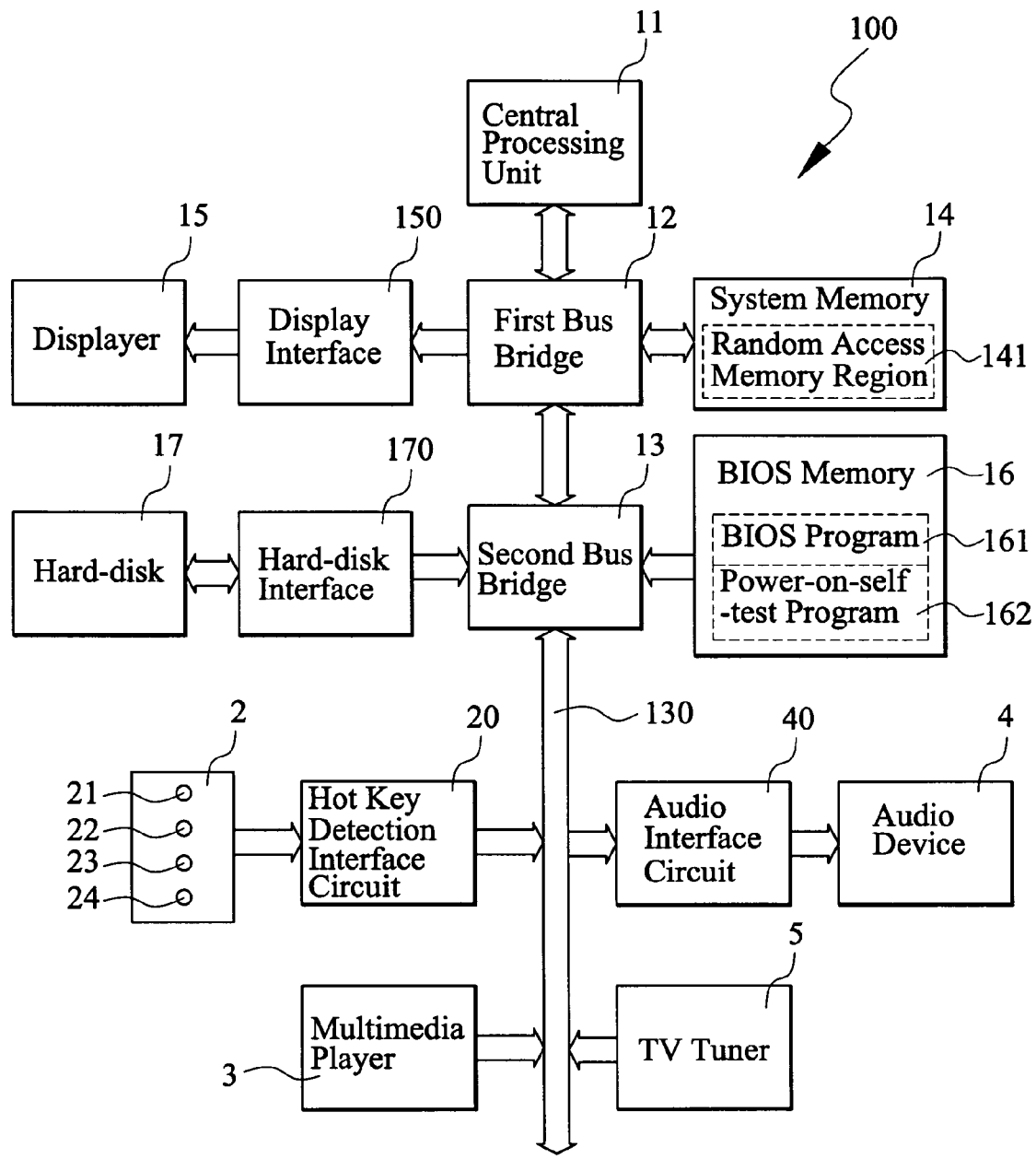
FIG. 1 shows a functional block diagram of an embodiment of the present invention.

With reference to the drawings and in particular to FIG. 1, which shows a functional block diagram of the first embodiment of the present invention, a computer 100 comprises a central processing unit 11, a first bus bridge 12, and a second bus bridge 13. The central processing unit 11 is connected to the first bus bridge 12 through a system bus. The first bus bridge 12 is connected to a system memory 14, and connected to a displayer 15 through a display interface 150.

The second bus bridge 13 is connected to a BIOS memory 16. The BIOS memory 16 stores a BIOS program 161 and a power-on-self-test (POST) program 162, required by the computer 100 during the booting.

The second bus bridge 13 is connected to a hard-disk interface 170 through a bus. The hard-disk interface 170 is connected to a hard-disk 17. The hard-disk 16 served as a data storage is for storing data in the present invention.

Figure 2:
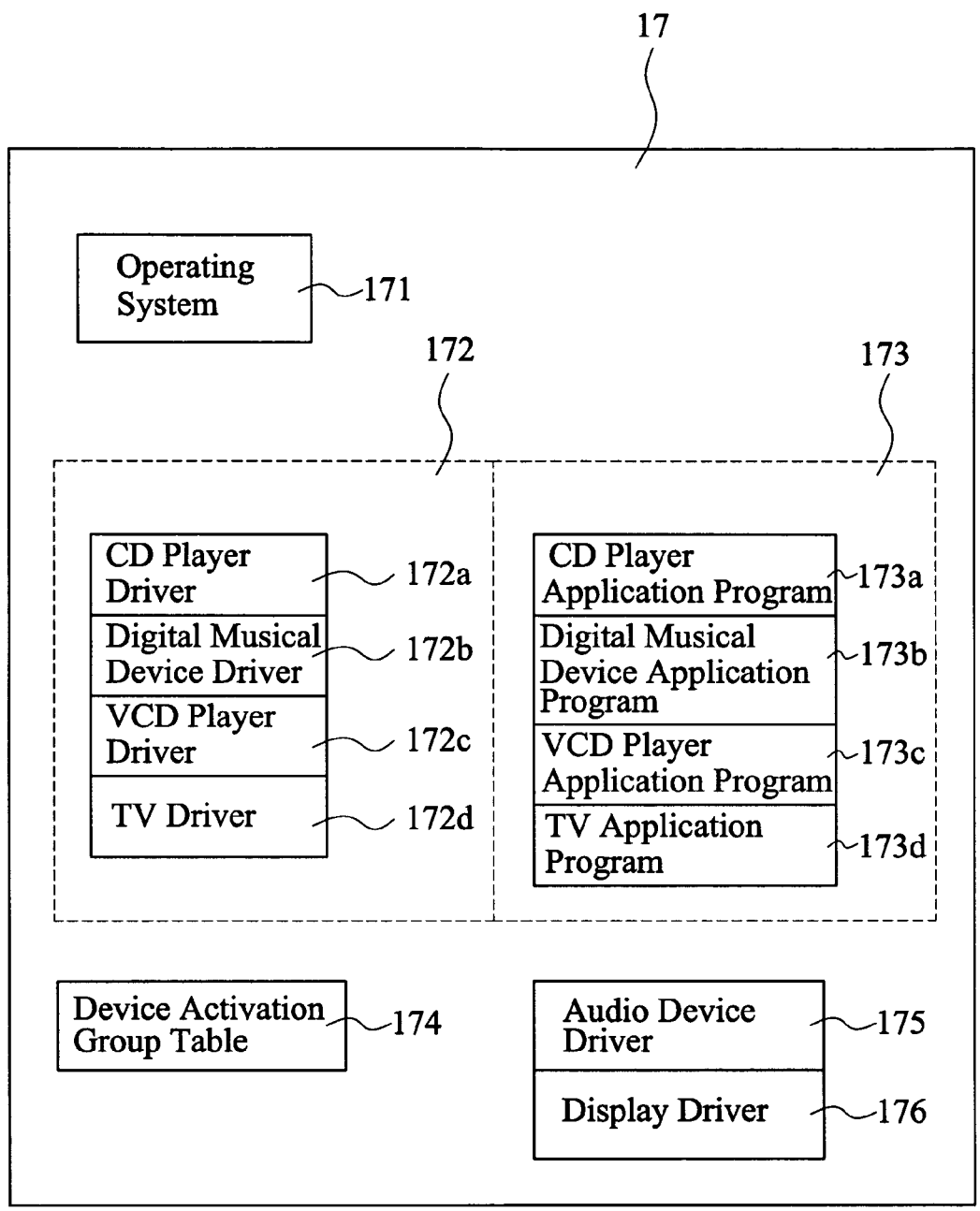
FIG. 2 shows the hard-disk of FIG. 1 is installed with an operating system, a set of device drivers, a set of application programs, a device activation group table, an audio device driver, and a display driver.

FIG. 2 shows the hard-disk of FIG. 1 is installed with an operating system 171, a set of device drivers 172 each for an associated multimedia player, a set of application programs 173 each for an associated one of the multimedia players, and a device activation group table 174.

In the embodiment of the present invention, the drivers 172 for the multimedia players include a CD player driver 172*a*, a digital musical device driver 172*b*, a VCD player driver 172*c*, and a TV driver 172*d*. The application programs 173 for the multimedia players include a CD player application program 173a, a digital musical device application program 173b, a VCD player application program 173c, and a TV application program 173d, respectively associated with the drives 172a, 172b, 172c, 172d. The hard-disk 17 also includes an audio device driver 175 and a display driver 176.

The second bus bridge 13 of the computer 100 is connected to a hot key detection interface circuit 20 through a bus 130, and the hot key detection interface circuit 20 is connected to a hot key set 2. The hot key set 2 includes a plurality of hot keys 21, 22, 23, 24, which activate a CD player, a digital music device, a VCD player and a TV, respectively, when operated by the user.

The hot keys 21, 22, 23, 24 can be defined as control keys for express activation of a multimedia player. The hot keys 21, 22, 23, 24 can be buttons installed on a panel of the corresponding multimedia player or on the computer 100. The hot keys 21, 22, 23, 24 can also be specific keys on a keyboard of the computer 100. The specific keys can be decoded by a keyboard controller (not shown) of the computer 100, and identified by the central processing unit 11 of the computer 100.

Figure 3:
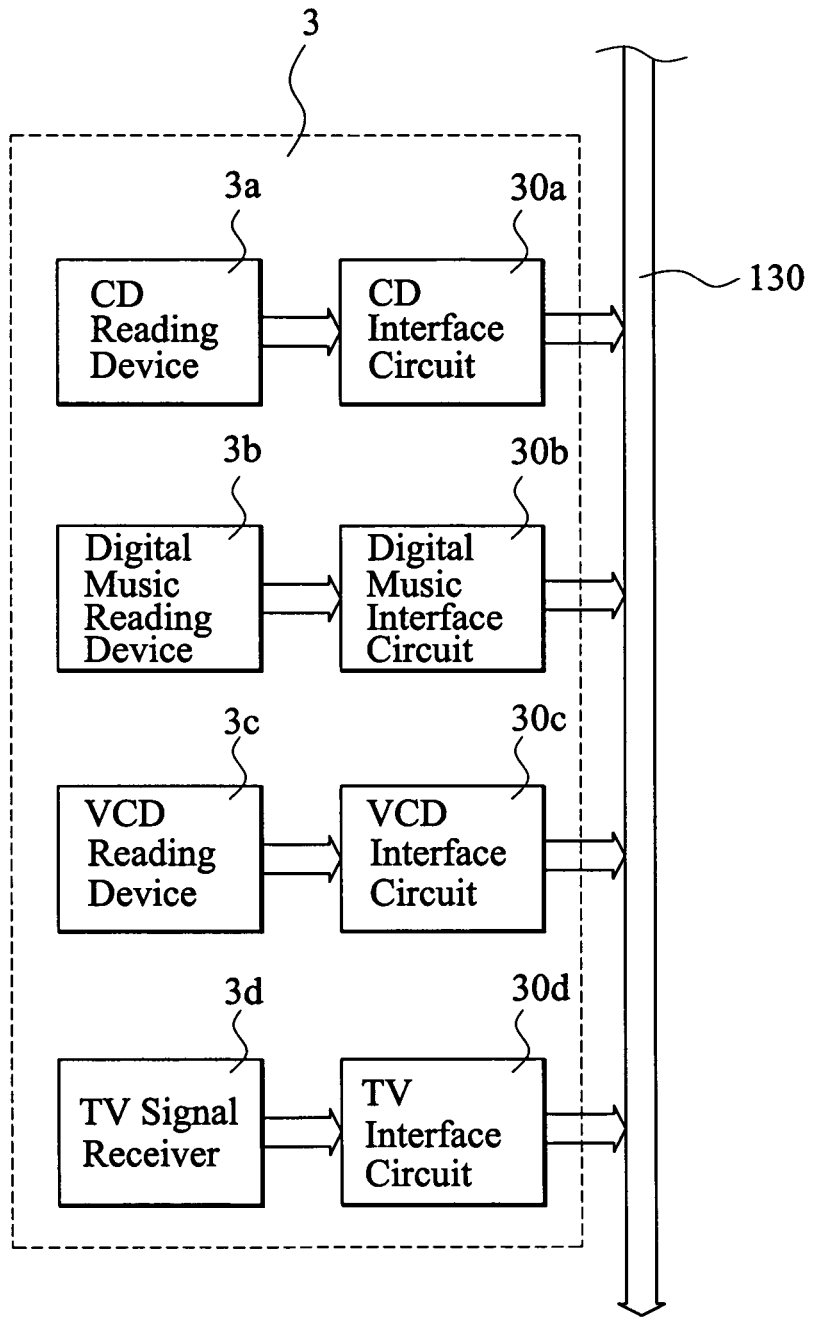
FIG. 3 shows a schematic view of a multimedia player of FIG. 1.

The second bus bridge 13 of the computer 100 is connected to a multimedia player 3 through a bus 130. FIG. 3 shows a schematic view of multimedia player 3. The multimedia player 3 comprises a CD reading device 3a, a digital music reading device 3b, a VCD reading device 3c, and a TV signal receiver 3d, connected to the bus 130 through a CD interface circuit 30a, a digital music interface circuit 30b, a VCD interface circuit 30c, and a TV interface circuit 30d, respectively.

The second bus bridge 13 of the computer 100 is connected to an audio interface circuit 40 through the bus 130. The audio interface circuit 40 is connected to an audio device 4. The second bus bridge 13 of the computer 100 is also connected to a TV tuner 5 through the bus 130.

FIG. 4 shows a schematic view of the device activation group table 174. The device activation group table 174 defines, according to the functional features of each multimedia player, each hot key 21, 22, 23, 24 and the associated multimedia player, driver 172a, 172b, 172c, 172d, and application program 173a, 173b, 173c, 173d. The device activation group table 174 includes a hot key field, a hot key code field, a mapped driver field, a mapped application program field, and a mapped device field. The device refers to a multimedia player connected to the computer 100. Each hot key 21, 22, 23, 24 maps to one or a group of mapped drivers, mapped application programs, and mapped devices.

Figure 5:
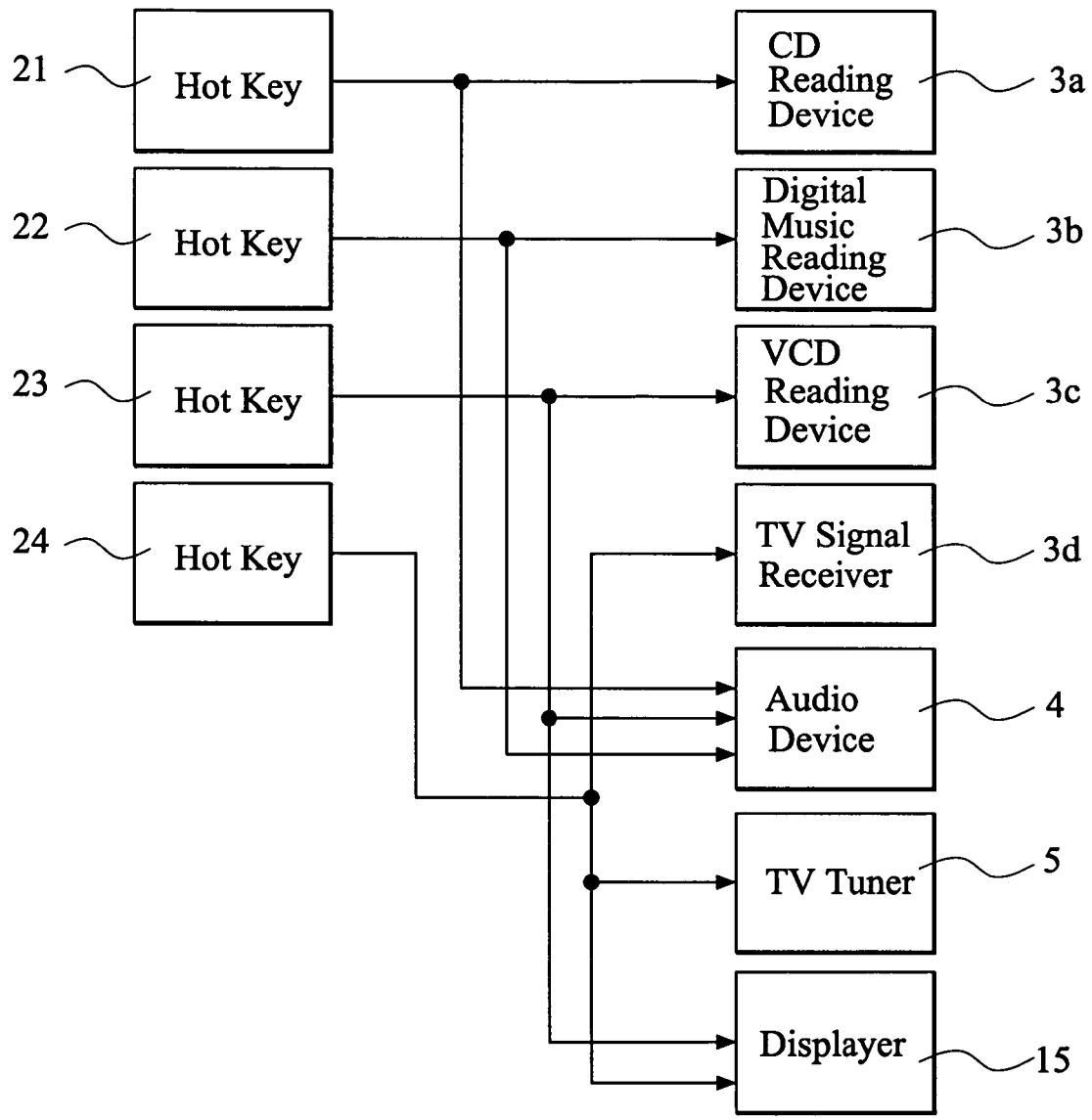
FIG. 5 shows a schematic view of the association of each hot key of the present invention.

FIG. 5 shows a schematic view of mapping between the hot keys and the group of devices. When a hot key 21, 22, 23, 24 is depressed, the compute 100 activates the group of devices listed in the mapped device field.

Figure 6:
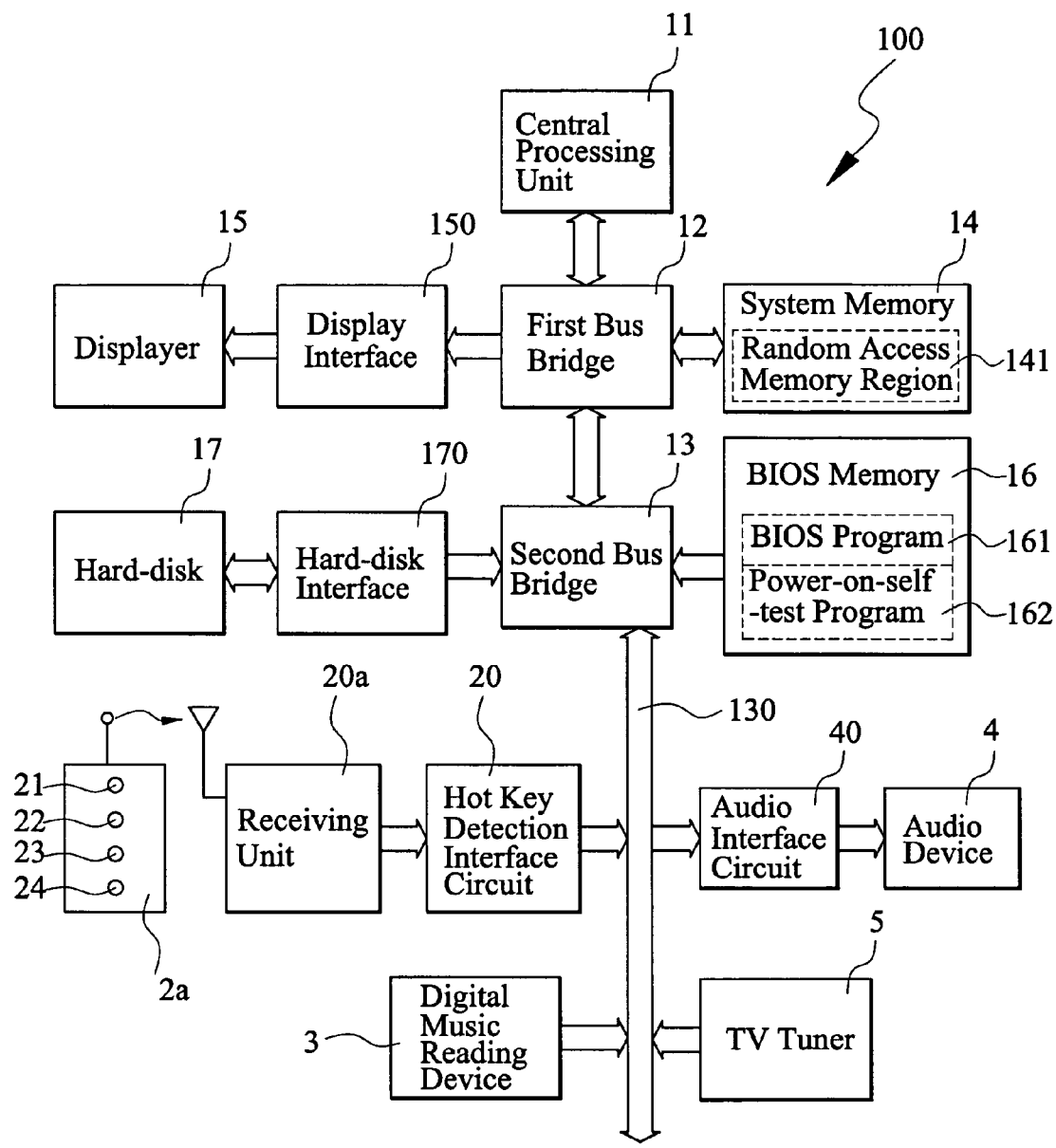
FIG. 6 shows a functional block diagram of another embodiment of the present invention.

FIG. 6 shows a functional block diagram of a second embodiment of the present invention. Most of the elements in the second embodiment are the same as those in FIG. 1. The difference is that the hot key detection interface circuit 20 is connected to a receiving unit 20a. The receiving unit 20a receives a wireless signal from a remote control unit 2a, and the hot keys 21, 22, 23, 24 are installed on the remote control unit 2a. When the user depresses any hot key 21, 22, 23, 24, the remote control unit 2a sends a corresponding wireless signal, which is received by the receiving unit 20a. The received signal is passed to the central processing unit 11 for processing through the hot key detection interface circuit 20, the bus 130, the second bus bridge 13, and the first bus bridge 12.

Figure 7:
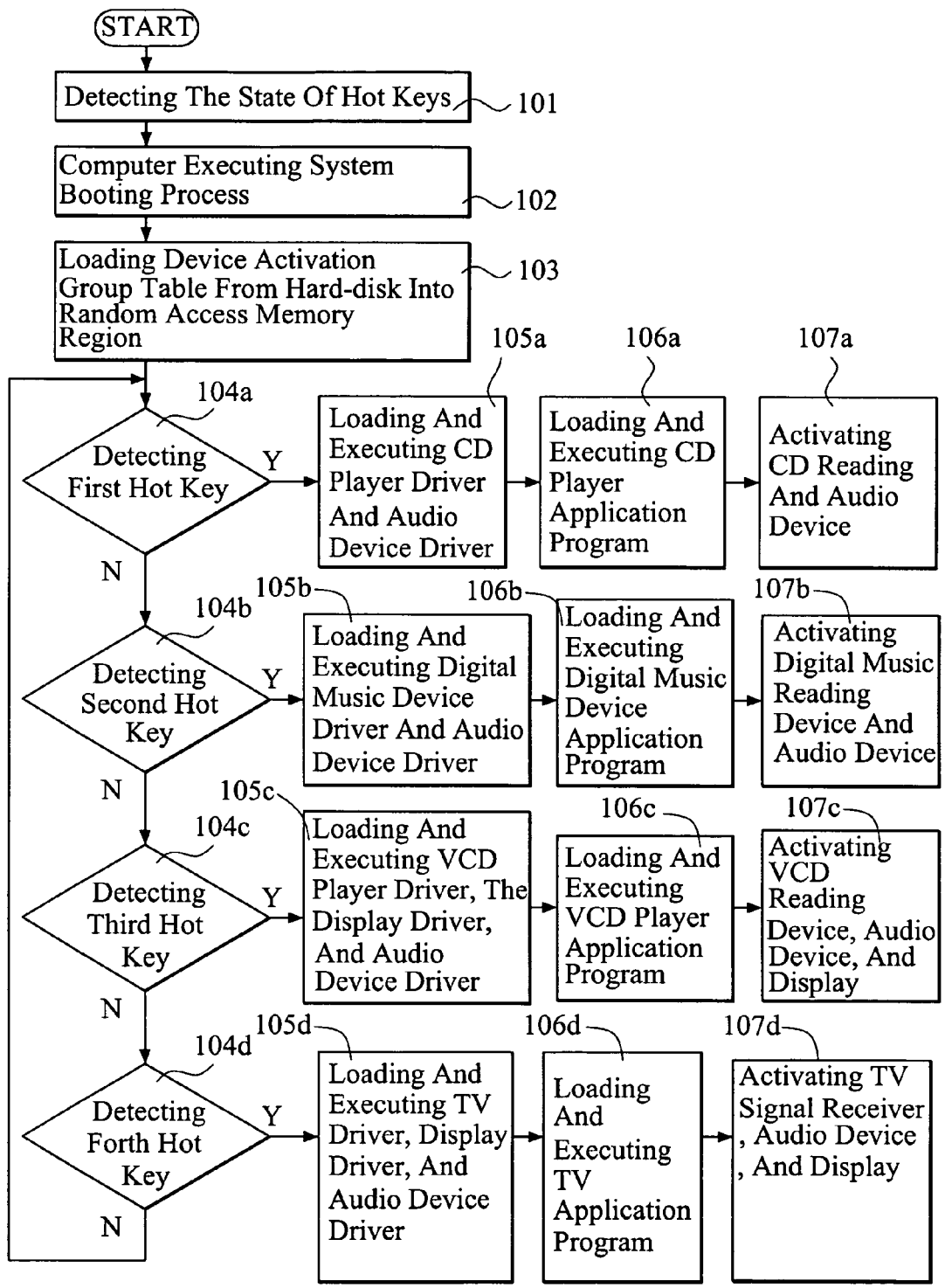
FIG. 7 shows a control flowchart of the present invention.

FIG. 7 shows a control flowchart of the present invention. In step 101, the user depresses a selected one of the hot keys 21, 22, 23, 24. In step 102, the computer 100 detects the state of the depressed hot key and executes the activation of the system, including loading and execution the BIOS program 161 and the POST program 162 from the BIOS memory 16, and loading and executing the operating system 171 from the hard-disk 17. In step 103, the computer 100 loads the device activation group table 174 from the hard-disk 17 into a random access memory region 141 of the system memory 14.

After the computer 100 finishes the above activation process, the computer 100 determines which multimedia player to activate according to the hot key that is depressed. If the hot key that is depressed is the hot key 21, as shown in step 104a, the computer 100 loads and executes the CD player driver 172a and the audio device driver 175 from the hard-disk 17 according to the definition in the device activation group table 174, as shown in step 105a. Step 106a is to load and execute the CD player application program 173a, and step 107a is to activate the CD reading device 3a and the audio device 4 to start playing the musical data read by the CD reading device 3a.

If the hot key that is depressed is the hot key 22, as shown in step 104b, the computer 100 loads and executes the digital music device driver 172b and the audio device driver 175 from the hard-disk 17 according to the definition in the device activation group table 174, as shown in step 105b. Step 106b is to load and execute the digital music device application program 173b, and step 107b is to activate the digital music reading device 3b and the audio device 4 to start playing the musical data read by the digital music reading device 3.

If the hot key that is depressed is the hot key 23, as shown in step 104c, the computer 100 loads and executes the VCD player driver 172c, the display driver 176, and the audio device driver 175 from the hard-disk 17 according to the definition in the device activation group table 174, as shown in step 105c. Step 106c is to load and execute the VCD player application program 173c, and step 107c is to activate the VCD reading device 3c, the audio device 4, and the display 15 to start playing the visual and musical data read by the VCD reading device 3c.

If the hot key that is depressed is hot key 24, as shown in step 104d, the computer 100 loads and executes the TV driver 172d, the display driver 176, and the audio device driver 175 from the hard-disk 17 according to the definition in the device activation group table 174, as shown in step 105d. Step 106d is to load and execute the TV application program 173d, and step 107d is to activate the TV signal receiver 3d, the audio device 4, and the display 15 to work with the TV tuner 5 to start playing the TV images and musical data read by the TV signal receiver 3d.

While the invention has been described in connection with what is presently considered to the most practical and preferred embodiment, it is to be understood that the invention is not to be limited to the disclosed embodiment, but on the contrary, is intended to cover various modifications and equivalent arrangement included within the spirit and scope of the appended claims.

What is claimed is:

1. A method for express execution of multimedia playing for a computer system, the computer system having a data storage, a system memory, a BIOS, an operating system, a plurality of hot keys, and a plurality of multimedia players, the data storage storing an operating system, a plurality of multimedia player drivers, and a plurality of multimedia player application programs, the method comprising the steps of:

storing a signal device activation group table in the data device storage, the device activation group table associating each hot key with the associated multimedia player, driver, and application program, wherein each hot key is associated with a single separate multimedia player in the device activation table;

in a state before the BIOS and the operating system are loaded and executed, detecting whether any one of the hot key is depressed;

when detecting that one of the hot keys is depressed, the computer system executing a system activation process including loading and executing the BIOS, and loading and executing the same operating system of the computer system irrespective of which one of the hot key is depressed;

after executing the system activation process, the computer system loading the device activation group table from the data storage into the system memory, and loading and executing the multimedia player driver associated with the depressed hot key according to the definition established in the device activation group table;

loading and executing the multimedia player application program associated with the depressed hot key according to the definition established in the device activation group table; and activating the multimedia player associated with the depressed hot key, while leaving other multimedia players inactivated.

2. The method as claimed in claim 1, wherein the depressed hot key is a hot key set to activate a CD player, the depressed hot key being defined in the device activation group table to be associated with a CD reading device and an audio device connected to the computer.

3. The method as claimed in claim 1, wherein the depressed hot key is a hot key set to activate a digital music device, the depressed hot key being defined in the device activation group table to be associated with a digital music reading device and an audio device connected to the computer.

4. The method as claimed in claim 1, wherein the depressed hot key is a hot key set to activate a VCD player, the depressed hot key being defined in the device activation group table to be associated with a VCD reading device, an audio device and a display connected to the computer.

5. The method as claimed in claim 1, wherein the depressed hot key is a hot key set to activate a TV signal receiver, the depressed hot key being defined in the device activation group table to be associated with a TV signal receiver, an audio device, a display and a TV tuner connected to the computer.

6. A method for express execution of multimedia playing for a computer system, the computer system having a data storage, a system memory, a BIOS, an operating system of the computer system, a plurality of hot keys, and a plurality of multimedia players, the data storage storing an operating system, a plurality of multimedia player drivers, a plurality of multimedia player application programs, the method comprising the steps of:

storing a single device activation group table in the data storage, the device activation group table associating each hot key with an associated multimedia player, driver, and application program, wherein each hot key is associated with a single separate associated multimedia player;

in a state before the BIOS and the operating system are loaded and executed, detecting whether any one of the hot keys is depressed;

when detecting that any one of the hot keys is depressed, the computer system executing a system activation process including loading and executing the BIOS, and loading and executing the same operating system of the computer system irrespective of which one of the hot keys is depressed;

after executing the system activation process, the computer system loading the device activation group table from the data storage into the system memory;

the computer system loading and executing the multimedia player driver associated with the depressed hot key according to the definition established in the device activation group table; and activating the multimedia player associated with the depressed hot key, while leaving other multimedia players inactivated.

7. The method as claimed in claim 6, wherein the depressed hot key is a hot key set to activate a CD player, the hot key being defined in the device activation group table to be associated with a CD reading device and an audio device connected to the computer.

8. The method as claimed in claim 6, wherein the depressed hot key is a hot key set to activate a digital music device, the hot key being defined in the device activation group table to be associated with a digital music reading device and an audio device connected to the computer.

9. The method as claimed in claim 6, wherein the depressed hot key is a hot key set to activate a VCD player, the hot key being defined in the device activation group table to be associated with a VCD reading device, an audio device and a display connected to the computer.

10. The method as claimed in claim 6, wherein the depressed hot key is a hot key set to activate a TV signal receiver, the hot key being defined in the device activation group table to be associated with a TV signal receiver, an audio device, a display and a TV tuner connected to the computer.

11. A method for express execution of multimedia playing for a computer system, the computer system having a data storage, a system memory, a BIOS, an operating system of the computer system, a plurality of hot keys, and a plurality of multimedia players, the data storage storing an operating system, a plurality of multimedia player drivers, a plurality of multimedia player application programs, the method comprising the steps of:

storing a single device activation group table in the data storage, the device activation group table associating each hot key with an associated multimedia player, driver, and application program, wherein each hot key is associated with a single separate associated multimedia player;

in a state before the BIOS and the operating system are loaded and executed, detecting whether any one of the hot keys is depressed;

when detecting that any one of the hot keys is depressed, the computer system executing a system activation process including loading and executing the BIOS, and loading and executing the same operating system of the computer system irrespective of which one of the hot keys is depressed;

after executing the system activation process, the computer system loading the device activation group table from the data storage into the system memory;

the computer system loading and executing the multimedia player driver associated with the depressed hot key according to the definition established in the device activation group table; and activating the multimedia player associated with the depressed hot key, while leaving other multimedia players inactivated;

wherein a first of the plurality of hot keys is a hot key set to activate a CD player, the hot key being defined in the device activation group table to be associated with a CD application program, a CD reading device and an audio device connected to the computer, and a second of the plurality of hot keys is a hot key set to activate a TV signal receiver, the hot key being defined in the device activation group table to be associated with a TV application program a TV signal receiver, an audio device, a display and a TV tuner connected to the computer.

* * * * *